June 24, 1930.    M. G. JOHNS    1,767,179
ANTIGLARE DEVICE
Filed Jan. 31, 1929
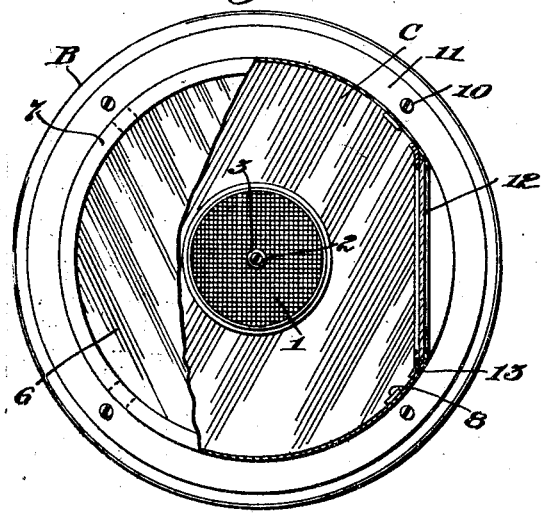
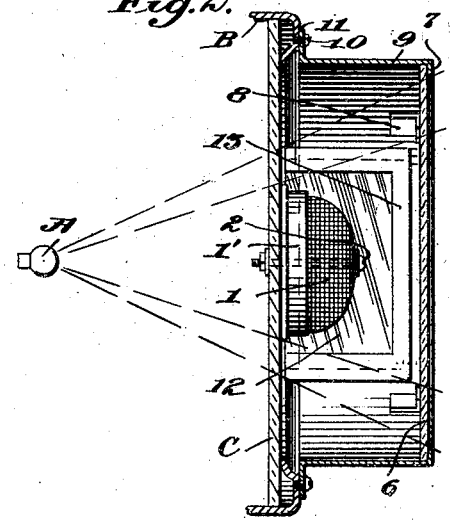
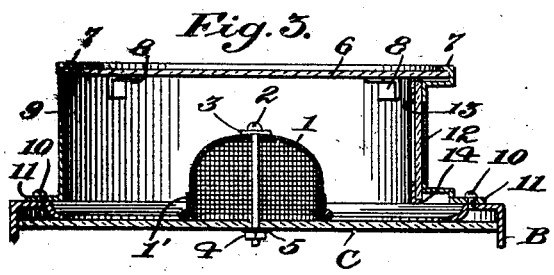
Inventor.
Milton G. Johns,
by Richard E. Babcock,
Att'y.

Patented June 24, 1930

1,767,179

UNITED STATES PATENT OFFICE

MILTON G. JOHNS, OF LANCASTER, PENNSYLVANIA

ANTIGLARE DEVICE

Application filed January 31, 1929. Serial No. 336,612.

This invention relates to dimmers or antiglare attachments for high-power automobile headlights.

It has for its primary objects to break up and diffuse the usual forwardly projected beam or shaft of light and to provide a very efficient soft full flood-light illumination of the road close to, and up to approximately sixty to seventy yards in advance of, the automobile.

Further objects are to provide means capable of application to practically any usual automobile headlight lamp casing construction; to provide a transparent closure means in advance of the beam disintegrating or diffusing means; to provide simple means for centering and holding said transparent closure means in proper relation to the lamp structure and the disintegrating or diffusing means, and to improve and simplify details of such attachments, all as hereinafter more particularly set forth, described, and claimed.

In the accompanying drawing:

Figure 1 represents a front elevation of a device embodying my invention as applied to a headlight, the transparent closure means or front glass closure being partially broken away to show elements to the rear thereof;

Figure 2, a vertical central longitudinal sectional view thereof, the central source of light A, such as an electric lamp, being conventionally indicated and all of the usual lamp structure, except the usual lens-holding rim or ring B and usual lens C, being omitted as forming no part of my invention; and Figure 3 represents a view similar to Fig. 2 taken at right angles thereto.

Referring now in detail to the drawing, A designates the usual source of illumination, such as an electric lamp; B the usual lens retaining rim or ring, broken away, of a usual automobile headlight, not shown; and C designates the usual lens held by said ring B in proper centered position in, or to, the front of the usual headlight lamp casing.

The center of said lens C is axially bored, and a cup-shaped or deeply concave beam disintegrating or diffusing element 1 of closely woven wire mesh material is arranged with its open end or edge substantially concentric with the central bore in the lens C and in contact with said lens and has its forward or concave closed end extending on a gentle continuous semi-elliptical curve radially outwardly to a point substantially in the axial plane of the edge and continuing from there abruptly approximately axially to said edge, a concentric confining or form retaining ring or annular band 1' being applied to, and about, said member 1 at or adjacent its edge. The primary function of this band 1' is simply that of a marginal binder and form retainer, otherwise its detail form and material is of no consequence. If desired a cushioning element may be applied to its inner edge to prevent its tapping on the lens C due to vibration.

The extreme central or forward portion of the element 1 is centrally bored, and the edges of such bore may be bound by a metal eyelet or in any other suitable manner to prevent spreading or raveling of the wires of which said element 1 is constituted.

When the element 1 is positioned on the lens C as above mentioned, the bores in said lens C and said element 1 will be in, or substantially in, axial alignment and a bolt 2 will be passed through said bores and will receive a nut 4 to draw and hold the element 1 firmly against the front face of lens C, washers 3 and 5 respectively being interposed between the head of the bolt 2 and the front face of element 1 and between the nut 4 and the rear or inner face of lens C and being of relatively small diameter, as illustrated, so as not to unduly intercept the light.

A plain glass front closure 6 is disposed in front of the forward portion of element 1, and is held properly centered in such position between the vertical annular rim flange 7 of annular band or casing 9 and retaining lugs 8 soldered or otherwise suitably secured in usual manner to the inner face of said band or casing 9, and the latter is held to, and supported by, the ring B by means of anchoring screws 10 or equivalents extending through the vertical annular rear flange 11 integral with casing 9 and into said ring B, four such lugs 8 and four such screws 10 being used in the embodiment illustrated, but obviously more or less of each may be employed so long as the parts are properly held in position.

If desired a portion of one side of the casing 9 may be cut out to form an opening and a transparent glass or other transparent element 12 inserted therein as by being thrust in between the adjacent portions of the casing 9 and a bracket or retaining frame 13 soldered or otherwise secured in usual manner to the inner face thereof and bending over the inner end portions 14 of said bracket or frame 13 flat against the inner end portions or edge of the glass or other transparent element 12, as illustrated in Fig. 3.

I contemplate providing the left side of the casing 9 of the left front headlight with such a vertically disposed transparent element 12 to light up the left side of the front of the automobile and the immediate portion of the roadway to aid approaching traffic.

Of course the transparent vertically disposed element 12 may also be similarly provided in the right headlight, or, if desired, such transparent elements 12 may be provided in both the right and left sides of the casing 9 of each headlight.

The lenses C and 6 will preferably be approximately equi-distantly spaced from the adjacent faces of, and respectively to the rear and in front of, the extreme forward portion of the diffusing element 1.

The element 1, as arranged as above described, will be in the path of the usual main or central beam of light as projected directly forward from the source of light A and the central portion of the usual reflector, not shown, and will preferably be of an extreme internal diameter approximately equal to, or slightly in excess of, the diameter of said beam in the vertical plane of the outer face of the lens C, and said beam, in passing through the meshes of the element 1, will be broken up into a multitude of rays, which rays will be laterally and vertically bent due to striking against, and intersecting reflection by, the inner, lateral and vertical faces of the crossing interwoven wires, which are round in cross-section and comprise a plurality of reversely directed successive angular portions, due to their interweaving, extending generally in a concave arcuate path.

The rays on emerging from the diffusing element 1 spread in general concentrically with said element 1 until they strike upon and pass through the plain glass 6, passing through the latter in a soft full flood of light without any definite bright portion or beam or glare, to light up the roadway very efficiently well ahead of the automobile to a distance of roughly between sixty to seventy yards, with a usual power headlight electric lamp A, and from that gradually tapering off in efficiency.

Having thus described my invention, what I claim as new and desire to secure by Letters Patent is:

1. A light projector anti-glare device comprising a transparent closure arranged in front of the source of light, a glass closure disposed in axial alignment with, and in advance of, said transparent closure, and means for holding said glass closure in proper spaced and centered relation to said transparent closure, in combination with a concave fine-mesh wire light-beam disintegrator and diffuser mounted with its edge presented toward, and arranged substantially concentric with the center of, said transparent closure and with the extreme forward portion of its convex face spaced from the adjacent face of said glass closure, and axially disposed means extending through the approximate central portions of said transparent closure and said disintegrator and diffuser for holding the same in proper relation.

2. A light projector anti-glare device comprising an inner transparent closure arranged in front of the source of light, a transparent front closure disposed in axial alignment with, and in spaced relation in advance of, said inner transparent closure, and means for holding said transparent front closure in proper relation to said inner transparent closure, in combination with a concave fine-mesh wire light-beam disintegrator and diffuser mounted with its edge against, and substantially concentric with the center of, said inner transparent closure and with its extreme forward portion spaced from said transparent front closure, and axially disposed means extending through the approximate central portions of said inner transparent closure and said disintegrator and diffuser for holding the same in proper relation with the edge of the disintegrator and diffuser in firm contact with said inner transparent closure.

In testimony whereof, I have signed my name to this specification at Lancaster, Pennsylvania, this 15th day of January, 1929.

MILTON G. JOHNS.